Feb. 17, 1925.
M. EDELMAN
1,527,158
FRICTION CLUTCH FOR ELECTRIC MOTORS
Filed April 11, 1924    2 Sheets-Sheet 1
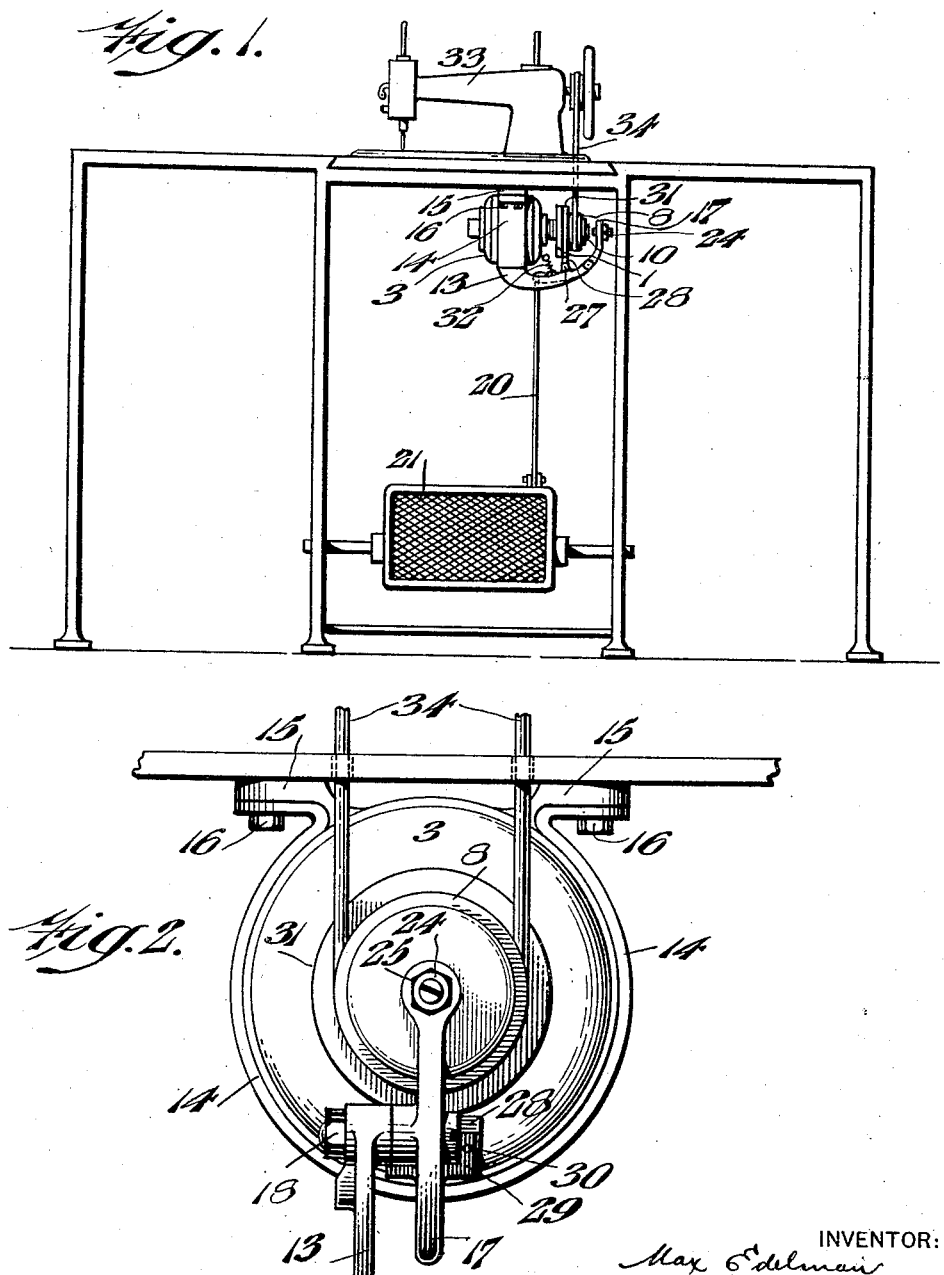
INVENTOR:
Max Edelman,
BY
ATTORNEYS.

Patented Feb. 17, 1925.

1,527,158

UNITED STATES PATENT OFFICE.

MAX EDELMAN, OF PHILADELPHIA, PENNSYLVANIA, ASSIGNOR TO MAX KAHN, OF PHILADELPHIA, PENNSYLVANIA.

FRICTION CLUTCH FOR ELECTRIC MOTORS.

Application filed April 11, 1924. Serial No. 705,744.

*To all whom it may concern:*

Be it known that I, MAX EDELMAN, a citizen of the United States, residing in the city and county of Philadelphia, State of Pennsylvania, have invented a new and useful Friction Clutch for Electric Motors, of which the following is a specification.

My invention relates to a novel clutch or transmitter for light power driven machines, such as sewing machines and the like, to be applied directly to the source of power such as an electric motor; thus eliminating all intermediate shafting and belting.

My invention relates more particularly to a friction disc clutch or transmitter which will be carried or supported entirely by the motor, thus obviating the necessity of aligning the motor with the transmitter as when the motor and clutch are independent of each other.

With the above ends in view my invention consists of a novel construction in a clutch, whereby the same may be attached directly to the shaft of a motor, while the actuating means for said clutch is secured to the body of the same, and is adapted to be operated by a foot treadle.

My invention further consists of a friction driving plate secured to the shaft of the motor, and a friction driven plate rotatably mounted on the hub of said driving plate and carrying a pulley, and a foot operated thrust lever for effecting a frictional engagement between said two plates pivotally supported on a bracket secured to the frame of the motor.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a front elevation of the general arrangement of a sewing machine, and a motor having mounted thereon a clutch embodying my invention.

Figure 2 represents a side elevation of the clutch.

Figure 3:
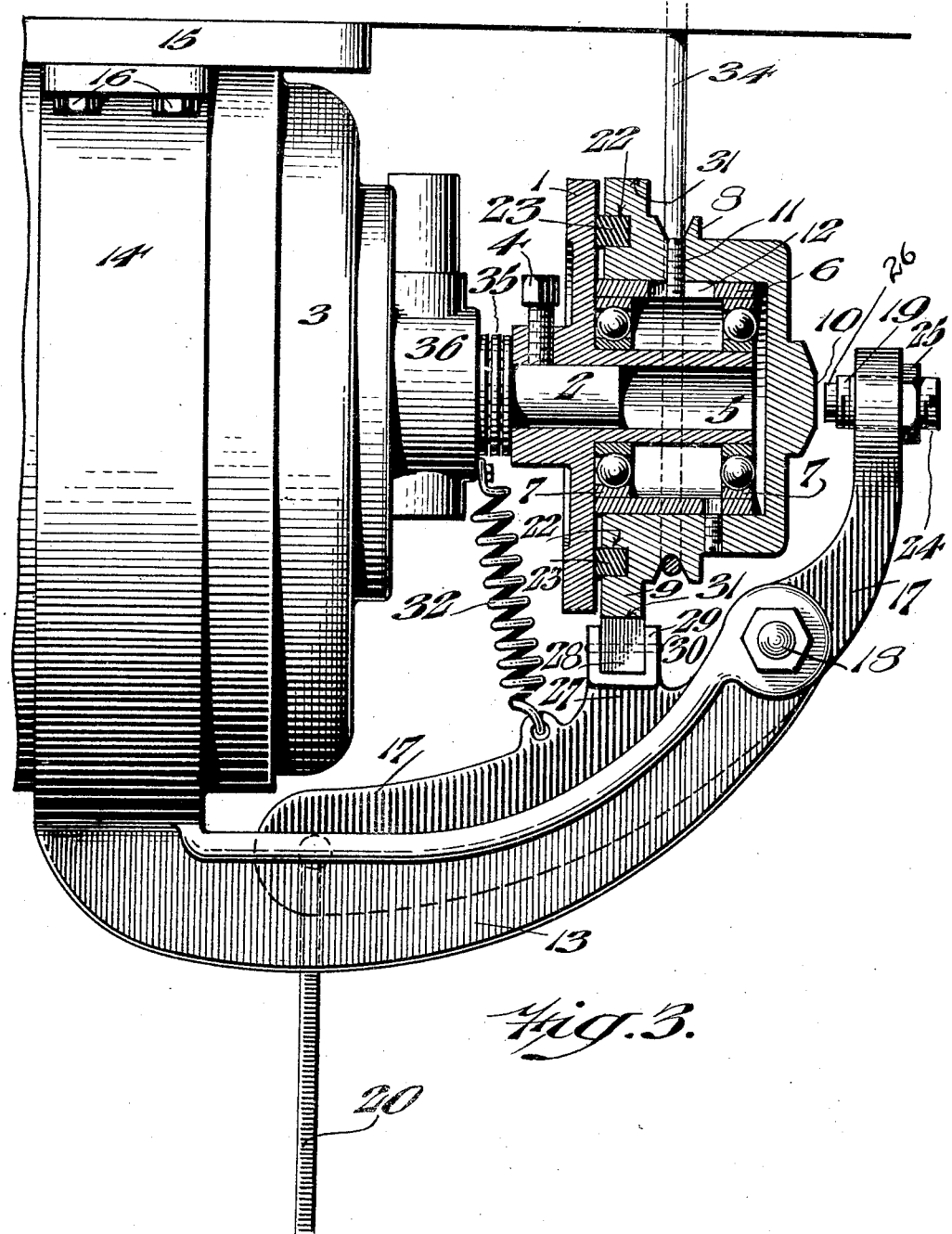
Figure 3 represents a longitudinal section of the clutch and a front elevation of the actuating means therefor.

Referring to the drawings 1 designates the driving plate of my novel clutch construction which is secured to the shaft 2 of an electric motor 3 by means of the set screw 4. The driving plate 1 is provided with an extended hub 5 on which is mounted the sleeve 6 free to revolve on the two ball bearing collars 7. The pulley or driving periphery 8 having integral therewith the friction driven plate 9 of the clutch, as well as the thrust point 10 is loosely mounted on the sleeve 6 and with the aid of the set screw 11 extending into the longitudinal elongated opening 12 is adapted to slide on said sleeve parallel to the axis while it is prevented from rotating relative to said sleeve.

The bracket 13 is secured to the frame of the motor by means of the yoke or straps 14 integral with said bracket which are bolted to the base 15 as shown at 16. To the end of the bracket 13 is pivotally secured the actuating lever 17 by means of the pivot bolt 18. The lever 17 is provided with the thrust member 19 at one end, while the treadle rod 20 is secured to the other end thereof. Thus by depressing the treadle 21 the thrust 19 is pressed against the thrust point 10 causing the pulley 8 to slide axially on the idling sleeve 6 towards the revolving driving plate 1, and thus causing a frictional engagement between the driving plate 1 and the driven plate 9, and hence imparting of rotation to the driven plate 9, as well as the pulley 8.

In order to secure a better frictional engagement between the two plates 1 and 9 of the clutch, one of the plates preferably the driven plate is provided with an annular groove 22 in the face thereof, into which is set a band of frictional material such as leather 23.

The thrust element consists of the adjustable pin 24 threaded into the end of the lever and provided with the locking nut 25 to fix the same in any position. In order to reduce the friction between the thrust joint 10 and the thrust element 19, I provide an anti-friction bearing on the end of the pin 24 by inserting a piece of anti-friction material such as wood 26 into a recess provided in the end of the pin 24. In case of wear this anti-friction bearing point 26 is readily renewable.

The actuating lever is further provided with a brake 27 consisting of a brake shoe 28 of some frictional material such as leather secured in the holder 29 by means of pins 30. The driven plate is provided with a cylindrical braking surface or brake drum 31 in alignment with the brake shoe 28.

The lever 17 is further provided with the tension spring 32 which constantly urges the brake shoe 28 against the braking surface 31 and at the same time tends to withdraw the thrust element 19 from operative engagement with the thrust point 10. By this collocation of the thrust element 10 and the brake shoe 28 on the two sides respectively of the fulcrum 18 on the lever 17, an alternative operation of the starting and stopping elements is obtained, that is, upon relieving the pressure from treadle 21, the lever 17 actuated by the spring 32 will withdraw the thrust element 19 and at the same time bring the brake shoe 28 into operative engagement with the brake drum 31 and thus cause the driven plate 9 and hence the pulley 8 to be brought to a quick stop.

By means of the novel construction described above, a very effective power transmission may be obtained from the motor 3 to any light power driven machine such as the sewing machine 33 (Figure 1). Due to the frictional engagement of the plates 1 and 9 a variable amount of power and hence speed may be imparted to the driving belt 34, by a single variation in the pressure exerted upon the treadle 21, at the same time a substantially positive engagement of the clutch surfaces may be obtained by a moderate pressure on the treadle, due to the high coefficient of friction between the metal and leather forming the two frictional surfaces respectively.

In order to take up the end thrust on the shaft of the motor, produced by the lever 17 pressing against the thrust point 10, I interpose a ball bearing thrust collar 35 between the inner hub 36 of the plate 1 and the bearing of the motor.

Having thus described my invention what I claim as new and desire to secure by Letters Patent, is:—

1. In a machine of the character stated, a yoke adapted to be clamped to a motor casing, a bracket projecting from the lower portion of said yoke, an actuating lever fulcrumed on the outer portion of said bracket, and having at its outer end a thrust member, a driven member comprising an outer central thrust point juxtaposed to said thrust member, a driving periphery, a peripheral brake drum, and a friction face, and a driving member coacting with said friction face, having an extension, which supports said driven member.

2. In a machine of the character stated, a yoke adapted to be clamped to a motor casing, a bracket projecting from the lower portion of said yoke, an actuating lever fulcrumed on the outer portion of said bracket, and having at its outer end a thrust member, a driven member comprising an outer central thrust point juxtaposed to said thrust member, a driving periphery, a peripheral brake drum, and a friction face, a driving member coacting with said friction face, and having an extension which supports said driven member and a brake shoe in operative alignment with said brake drum, supported by the inner portion of said actuating lever, a spring secured to said lever urging said thrust member into an inoperative position and urging said brake shoe into operative engagement with said brake drum and foot operated means connected to said lever, adapted to force said thrust member into operative engagement with said driven member and to withdraw said brake shoe from operative engagement with said brake drum against the force of said spring.

3. In a friction clutch for motors, a motor casing, a frictional driving element adapted to be secured to the shaft of the motor, and a corresponding driven frictional element supported by said driving element and free to rotate relative to the same when in the normal position, a bracket supported on said motor casing, and a lever pivotally mounted on said bracket and adapted to force the said frictional elements into engagement with each other, said driven element having a brake drum integral therewith, and said actuating lever having a brake shoe thereon in operative alignment with said brake drum, and means for forcing said brake shoe into engagement with said brake drum, when the said lever is in the inoperative position.

4. In a device of the character described, a yoke adapted to substantially encircle the casing of a motor, lugs at the extreme ends of said yoke adapted to be secured to the base of the motor, a bracket projecting from the lower portion of said yoke, an actuating lever fulcrumed on the outer portion of said bracket, and having at its outer end a thrust member, a driven member comprising an outer central thrust point juxtaposed to said thrust member, a driving periphery, a peripheral brake drum, and a friction face, and a driving member coacting with said friction face and having an extension which supports said driven member.

MAX EDELMAN.

Witnesses:
N. BUSSINGER,
LEONARD L. KALISH.